United States Patent
Konno

(10) Patent No.: US 8,249,352 B2
(45) Date of Patent: Aug. 21, 2012

(54) DOCUMENT IMAGE PROCESSING APPARATUS, DOCUMENT IMAGE PROCESSING METHOD AND COMPUTER READABLE MEDIUM

(75) Inventor: Yuya Konno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 994 days.

(21) Appl. No.: 12/076,502

(22) Filed: Mar. 19, 2008

(65) Prior Publication Data

US 2009/0060336 A1    Mar. 5, 2009

(30) Foreign Application Priority Data

Aug. 27, 2007  (JP) ................ 2007-220084

(51) Int. Cl.
*G06K 9/00* (2006.01)
(52) U.S. Cl. ............ 382/182; 382/305; 704/2
(58) Field of Classification Search ......... 382/182
See application file for complete search history.

(56) References Cited

U.S. PATENT DOCUMENTS

| | | | |
|---|---|---|---|
| 5,727,082 A | 3/1998 | Sugishima | |
| 6,466,954 B1 | 10/2002 | Kurosawa et al. | |
| 7,120,868 B2 * | 10/2006 | Salesin et al. | 715/249 |
| 2002/0064316 A1 * | 5/2002 | Takaoka | 382/305 |
| 2002/0101614 A1 * | 8/2002 | Imes | 358/1.18 |
| 2004/0070573 A1 * | 4/2004 | Graham | 345/179 |
| 2004/0194028 A1 * | 9/2004 | O'Brien | 715/517 |
| 2004/0205568 A1 * | 10/2004 | Breuel et al. | 715/513 |
| 2006/0217954 A1 * | 9/2006 | Koyama et al. | 704/2 |

FOREIGN PATENT DOCUMENTS

| | | |
|---|---|---|
| JP | A 05-324720 | 12/1993 |
| JP | A 07-28829 | 1/1995 |
| JP | A 08-6948 | 1/1996 |
| JP | A 08-129550 | 5/1996 |
| JP | A-11-272871 | 10/1999 |
| JP | B2 3213197 | 7/2001 |
| JP | A-2001-216292 | 8/2001 |
| JP | A 2002-288169 | 10/2002 |
| JP | A-2006-268150 | 10/2006 |
| JP | A-2006-276905 | 10/2006 |

\* cited by examiner

*Primary Examiner* — Hadi Akhavannik
(74) *Attorney, Agent, or Firm* — Oliff & Berridge, PLC

(57) ABSTRACT

A document image processing apparatus includes an specifying section, an extracting section, a recognizing section, an interpreting section, an arranging section and a generating section. The specifying section specifies a sentence region including a character row from a document image. The extracting section extracts at least one of character row images included in the specified sentence region. The recognizing section recognizes respective characters included in the extracted character row image. The interpreting section interprets an original sentence character row comprising the recognized characters and generates an interpreted sentence character row. The arranging section arranges the respective character row images in the sentence region by contracting the respective character row images. The arranging section arranges the generated respective interpreted sentence character rows in a vacant region except a region arranging the respective character row images from the sentence region.

19 Claims, 6 Drawing Sheets

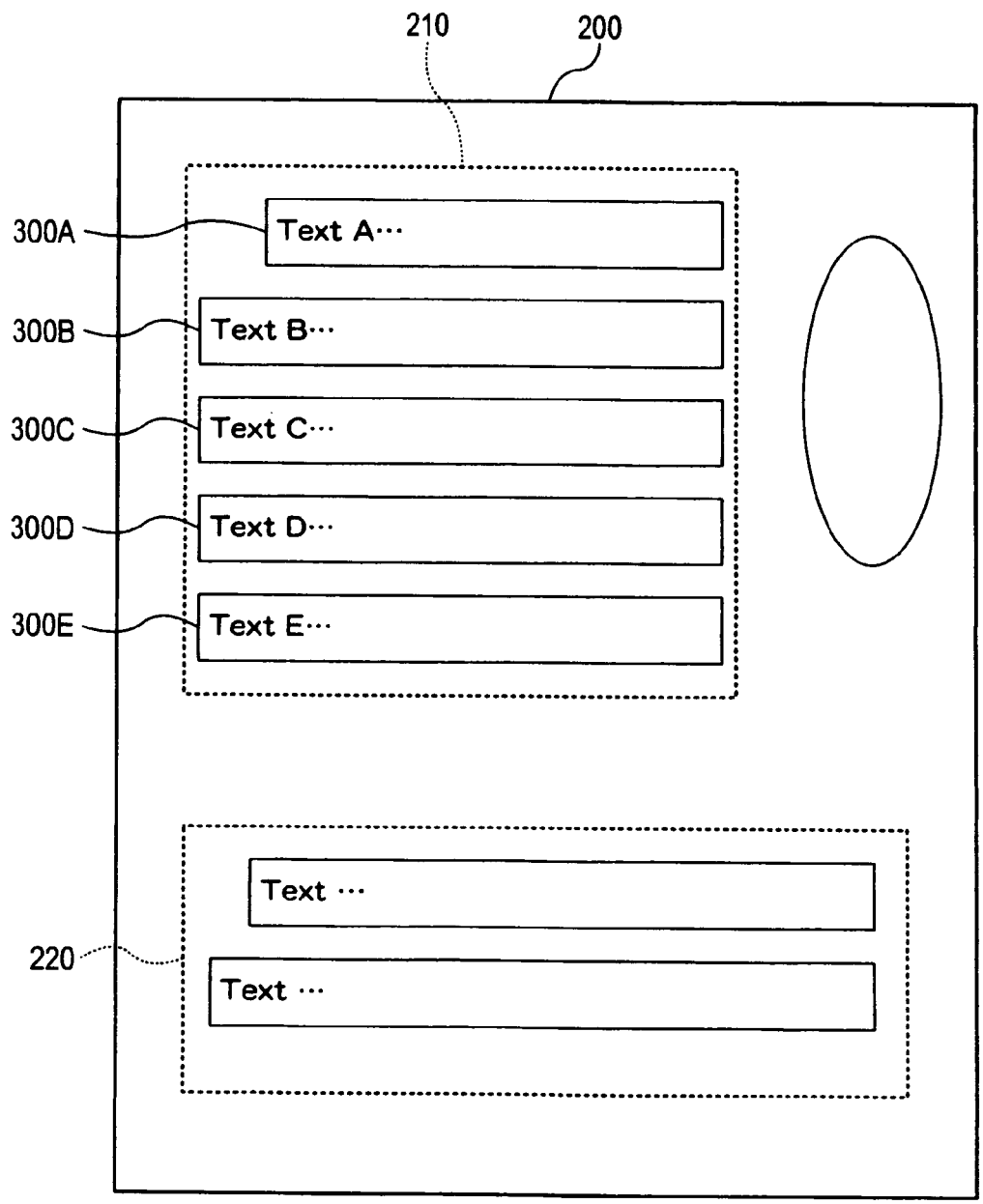

DOCUMENT IMAGE PROCESSING APPARATUS, DOCUMENT IMAGE PROCESSING METHOD AND COMPUTER READABLE MEDIUM

CROSS-REFERENCE TO RELATED APPLICATIONS

This application is based on and claims priority under 35 USC 119 from Japanese Patent Application No. 2007-220084 filed Aug. 27, 2007.

BACKGROUND

1. Technical Field

The present invention relates to a document image processing apparatus and a computer readable medium.

2. Related Art

There is a technology of subjecting a document image to character recognition by OCR, interpreting a result of the character recognition and outputting an interpreted sentence. In the technology, there is a case in which both of an original sentence and the interpreted sentence are arranged in the same document image to output.

SUMMARY

According to an aspect of the invention, a document image processing apparatus includes a specifying section, an extracting section, a recognizing section, an interpreting section, an arranging section and a generating section. The specifying section specifies a sentence region including a character row from a document image. The extracting section extracts at least one of character row images included in the specified sentence region. The recognizing section recognizes respective characters included in the extracted character row image. The interpreting section interprets an original sentence character row comprising the recognized characters and generates an interpreted sentence character row. The arranging section arranges the respective character row images in the sentence region by contracting the respective character row images. The arranging section arranges the generated respective interpreted sentence character rows in a vacant region except a region arranging the respective character row images from the sentence region. The generating section generates a data of an output document arranged with the respective character row images and the respective interpreted sentence character rows in the sentence region.

BRIEF DESCRIPTION OF THE DRAWINGS

Exemplary embodiments of the present invention will be described in detail based on the following figures, wherein:

FIG. 2 is a view showing an example of a document image acquired by a document image acquiring section;

DETAILED DESCRIPTION

An explanation will be given of an exemplary embodiment in reference to the drawings as follows.

Figure 1:
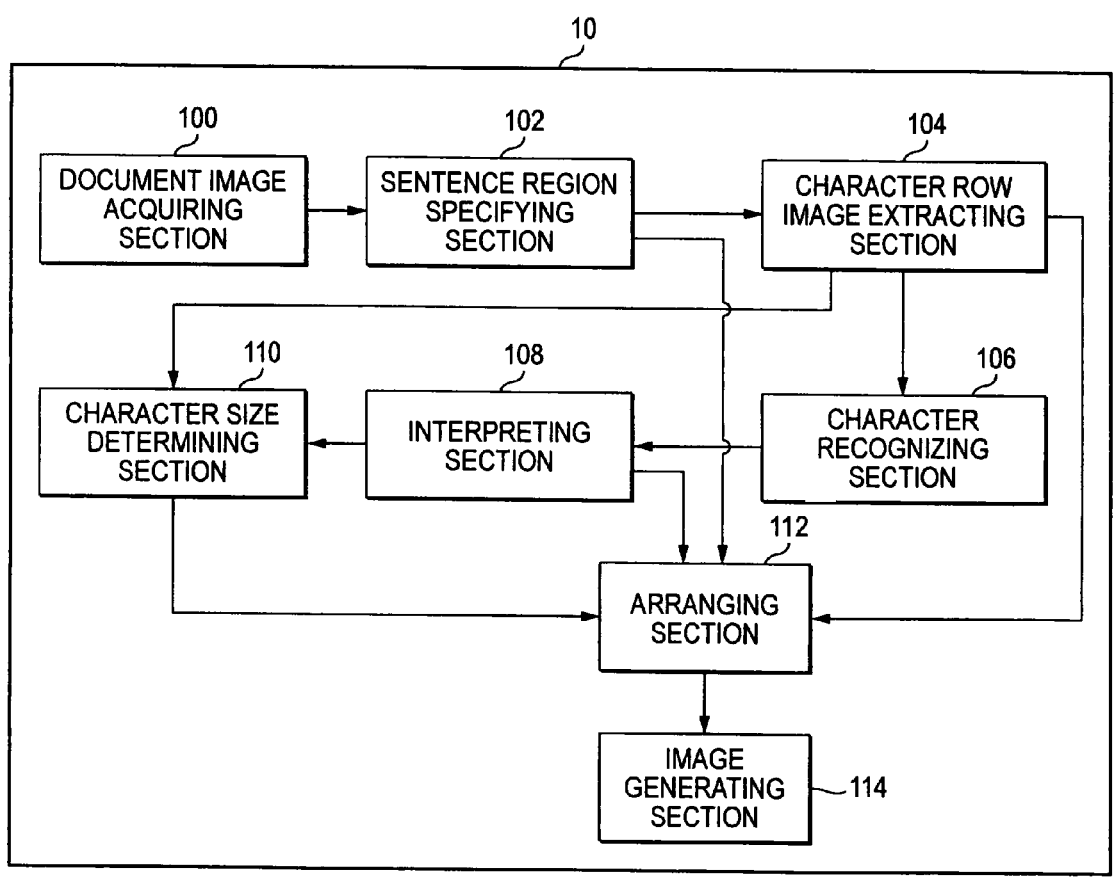
FIG. 1 is a functional block diagram of a document image processing apparatus according to an exemplary embodiment.

FIG. 1 is a functional block diagram of a document image processing apparatus according to the exemplary embodiment. As shown in FIG. 1, as a functional constitution, the document image processing apparatus 10 includes a document image acquiring section 100, a sentence region specifying section 102, a character row image extracting section 104, a character recognizing section 106, an interpreting section 108, a character size determining section 110, an arranging section 112 and an image generating section 114. The above-described respective functions may be realized by operating the document image processing apparatus 10 constituting a computer system in accordance with a computer program. Further, the computer program may be stored in all modes of computer readable information record media of CD-ROM, DVD-ROM, a flash memory and the like and read by a media reading apparatus, not illustrated, connected to the document image processing apparatus 10. Further, the computer program may be downloaded to the document image processing apparatus 10 through a network.

The document image acquiring section 100 acquires the image data of a document image including a character row (hereinafter, document image data). The document image acquiring section 100 may acquire a document image data by, for example, receiving an input of a document image data scanned by a scanner, not illustrated, connected to the document image processing apparatus 10.

FIG. 2 shows an example of a document image 200 acquired by the document image acquiring section 100. As shown in FIG. 2, the document image 200 includes at least one of portions including character row. The portion is, for example, a sentence region 210, a sentence region 220. The document image 200 may include other object, such as an image, other than a character row.

The sentence region specifying section 102 specifies a sentence region included in the document image represented by the document image data based on the document image data acquired by the document image acquiring section 100. For example, in the example of the document image 200 as shown in FIG. 2, respective positions, region sizes and the like of the sentence region 210, the sentence region 220 and the like are specified.

The character row image extracting section 104 extracts, from the sentence region specified by the sentence region specifying section 102, a character row image including at least one character. There may be a single or the plural character row images extracted by the character row image extracting section 104. Although according to the exemplary embodiment, a character row image is extracted by constituting a unit by a row, a character row image may be extracted by constituting a reference by other unit of a phrase, a clause, a sentence, a paragraph or the like. According to the exemplary embodiment, in the example of the document image 200 shown in FIG. 2, with regard to the specified sentence region 210, character row images 300A, 300B, 300C, 300D, and 300E are extracted for respective rows.

The character recognizing section 106 recognizes respective characters included in the character row image extracted by the character row image extracting section 104. For recognizing a character, a publicly-known character recognizing technology may be used. The character recognizing section 106 generates a data of a character row by connecting respective characters constituted by subjecting the character row image to character recognition (hereinafter, referred to as original sentence character row). The character recognizing processing is carried out for respective character row images.

The interpreting section 108 interprets the original sentence character row comprising characters recognized by the character recognizing section 106 into other language to generate an interpreted sentence character row. In the above-described interpretation processing, a publicly-known interpretation processing technology may be used, it is not particularly limited to which language the original document is interpreted and a user may set a language to which the original document is interpreted.

The character size determining section 110 determines respective sizes of the character row image (original sentence) and the interpreted sentence character row generated by the interpreting section 108. The respective sizes of the character row image (original sentence) and the interpreted sentence character row are determined based on a length of a total of the character row image, the number of total characters of the interpreted sentence character row, a size of the sentence region, an inter-line rate set to the sentence region and the like. Here, the size of the character row image is a height and a width of the character row image, and the size of the interpreted sentence character row is a character size of each interpreted sentence character.

Figure 3A:
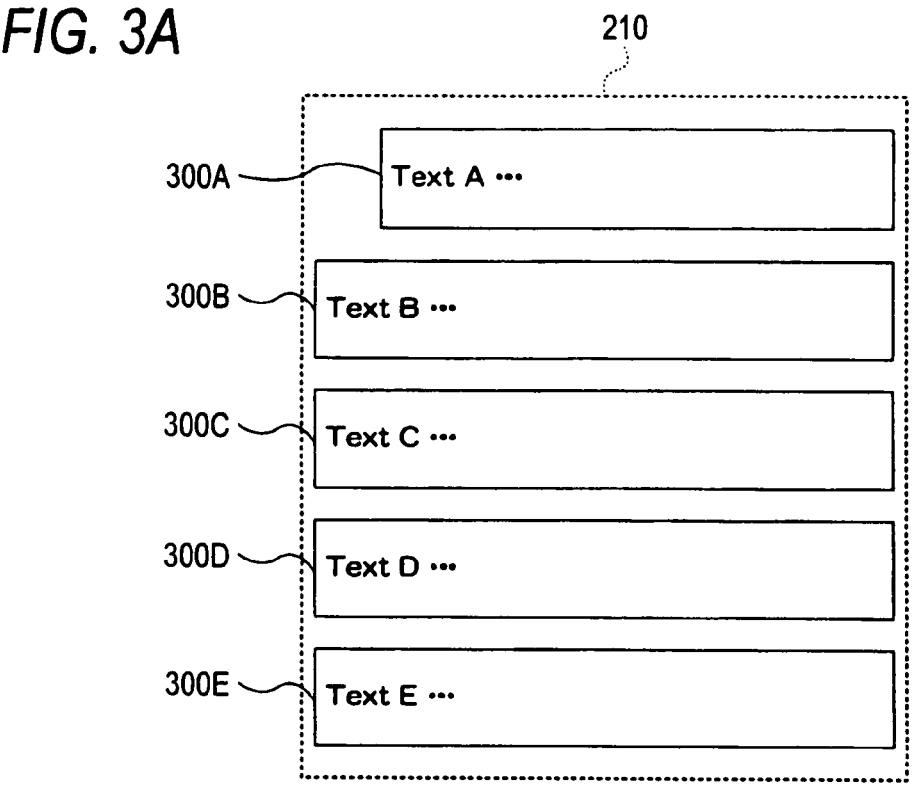
FIG. 3 illustrates views showing an example of a sentence region before conversion and after conversion.
Figure 3B:
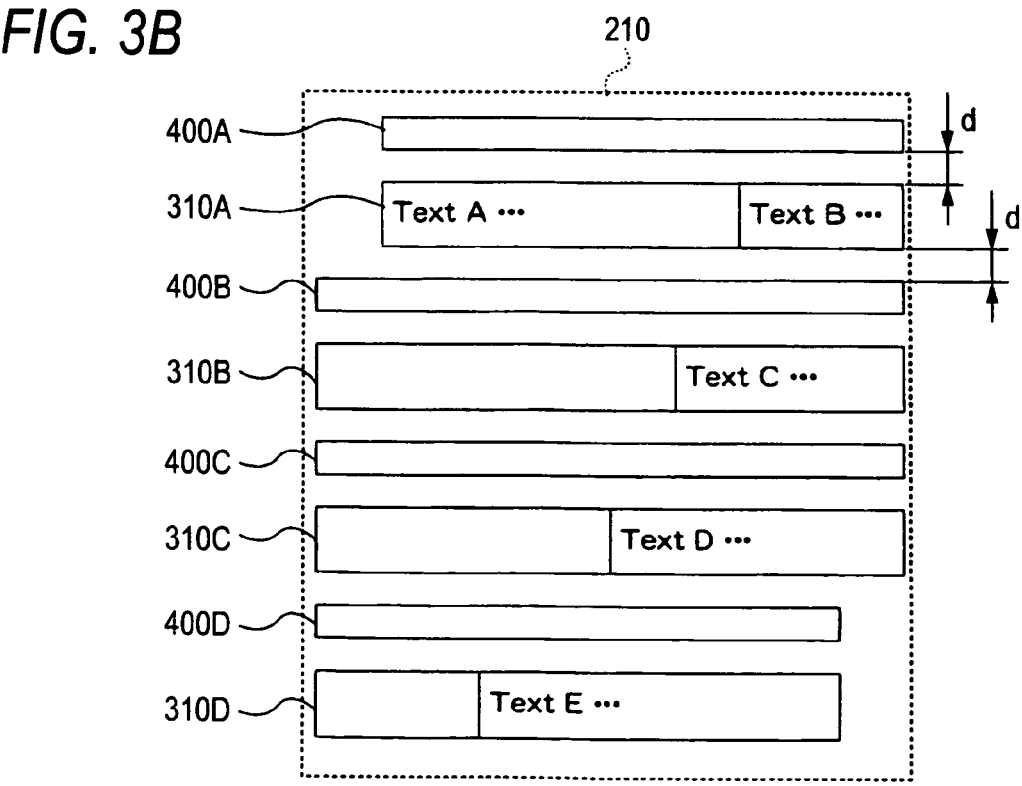

The arranging section 112 arranges the character row image and the interpreted sentence character row to be contained in the sentence region based on the respective sizes of the character row image (original sentence) and the interpreted sentence character row which are determined and lengths of both, sizes of sentence regions for arranging the both and the like. For example, the arranging section 112 reconstitutes a sentence region in an original document image shown in FIG. 3A into a sentence region arranged with both of the original sentence character row image and the interpreted sentence character row as shown in FIG. 3B. Further, details of processing of the arranging section 112 will be described later.

The image generating section 114 generates an output document image arranged with the character row image and the interpreted sentence character row at the sentence region by the arranging section 112. The output document image may be generated as, for example, a bit map data. Further, the generated output document image may be transferred to a printer, not illustrated, connected to the document image processing apparatus 10 to be printed to output thereby.

Next, an explanation will be given of a series of flow of a document image generating processing by the document image processing apparatus 10 in reference to flowcharts shown in FIG. 4 and FIG. 5.

[Document Image Generating Processing]

Figure 4:
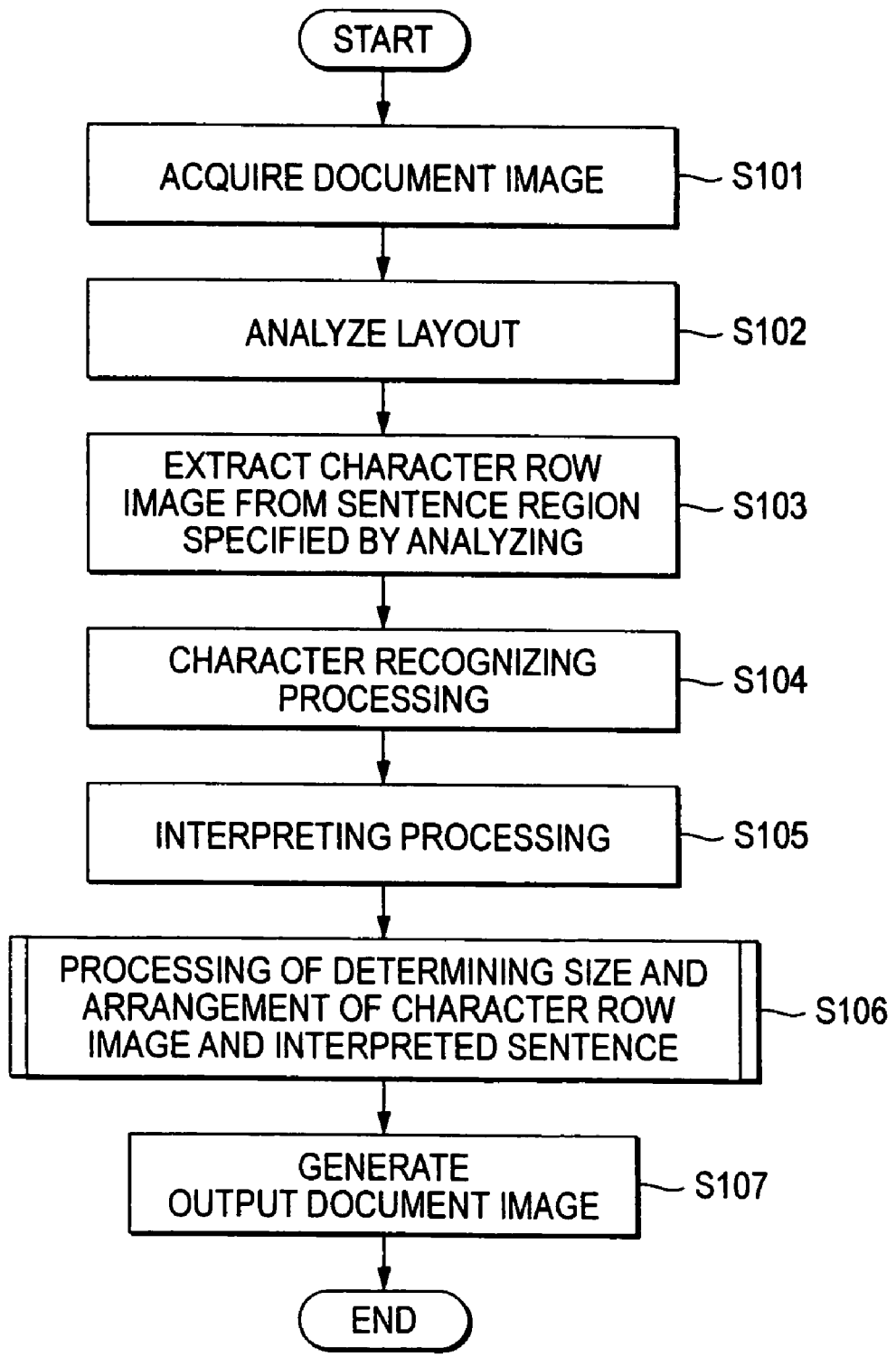
FIG. 4 is a flowchart of processing of the document image processing apparatus.

FIG. 4 shows a flowchart representing a flow of a document image generating processing. First, the document image processing apparatus 10 acquires a scan image data of the document image (S101). The document image processing apparatus 10 analyzes a layout for the acquired document image (S102), and specifies a sentence region including a character row from the document image based on a result of analyzing the layout. Further, the document image processing apparatus 10 extracts character row images of the respective rows included in the specified character region (S103) and stores the extracted character row image to a memory.

Next, the document image processing apparatus 10 recognizes characters by partitioning the extracted character row image into rectangular regions of respective characters by a predetermined image processing (S104). The document image processing apparatus 10 analyzes a structure of the original sentence character row comprising characters provided by recognizing the characters, thereafter, interprets the original sentence character row into a predetermined language (S105) to generate the interpreted sentence character row.

The document image processing apparatus 10 determines respective sizes and respective arrangements in the sentence region of the generated interpreted sentence character row and the character row image (original sentence) stored to the memory based on the size of the sentence region and the inter-line rate set to the sentence region, the number of characters of the interpreted sentence character row, a length of the character row image and the like (S106). Details of the determining processing will be explained as follows in reference to the flowchart shown in FIG. 5.

First, the document image processing apparatus 10 sets a rate of a region used as an inter-line space with regard to the sentence region (hereinafter, inter-line rate) (S201). The inter-line rate is a proportion of a region excluding regions of arranging the character row image and the interpreted sentence character row to the sentence region. The inter-line rate may be determined based on a rate of an inter-line space in the original sentence region, or may be set to a previously determined value.

Next, size rates of the character row image (original sentence character) and the interpreted sentence character are tentatively set to predetermined values (S202). Here, the size rates are set based on a ratio of heights of respective characters. For example, respective sizes may be set such that a ratio of a height H1 of the original sentence character and a height H2 of the interpreted sentence character is 1:1 or 2:1. Further, a length of a total of the interpreted sentence character row is calculated based on the character size of the interpreted sentence character set based on the size rates (S203).

Here, when total length of the original sentence character row image(s) and total length of the interpreted sentence character row(s) are aligned (S204:Y), size of each original sentence character row image and size of each interpreted sentence character row are resized (S205). The sizes may be resized such that when, for example, a length of a longer one of the original sentence character row image and the interpreted sentence character row is designated by notation N, and a length of a shorter one thereof is designated by notation M, the sizes may be corrected by multiplying the character size of the shorter one by M/N.

Next, the document image processing apparatus 10 determines as to whether the original sentence and the interpreted sentence of current character sizes are confined in the sentence region or not (S206). The determination is carried out by calculating a maximum height $H_{max}$ of a region capable of arranging the original sentence and the interpreted sentence in the sentence region from the set inter-line rates, and determining whether H=H1 (height of line original sentence character size of original sentence)·L1 (the number of lines)+H2 (line interpreted sentence character size of interpreted sentence)·L2 (the number of lines) is confined to be equal to or smaller than $H_{Max}$. Here, when H>$H_{Max}$, that is, when determined not to be confined in the sentence region (S206: N), character sizes of the original sentence (image) and the interpreted sentence are respectively contracted (S207). As a contraction rate, for example, the original sentence (image) and the interpreted sentence may respectively be multiplied by $H_{Max}$/H to be contracted. Further, the contraction rate is not limited to the above-described but contraction rates of the both may be constituted by different contraction rates, or either one thereof may be contracted.

The document image processing apparatus 10 allocates a region previously ensured as inter-line space to the inter-line space (S208). In allocating the inter-line, the inter-line space may be constituted by a rate which differs in accordance with the original sentence and the interpreted sentence, or the same inter-line space may be constituted for the both. Further, the original sentence character row image and the interpreted sentence character row are arranged based on the allocated inter-line spaces and the respective sizes of the original sentence and the interpreted sentence.

FIG. 3B shows an example of the sentence region arranged with the original sentence character row image and the interpreted sentence character row. As shown in FIG. 3B, arrangements of the both are repeated by a rule of arranging one line of the interpreted sentence character row and arranging the original sentence character row image therebelow. Further, in the example shown in FIG. 3B, the inter-line space of the original sentence character row image and the interpreted sentence character row is designated by notation d. Further, in a case in which each original sentence character row image reaches a length of a line of the sentence region when arranged to be put close successively from the left, the character row image is divided at the position and a remaining divided portion image is arranged at a next line. In this way, line images 310A, 310B, 310C and 310D are newly generated in accordance with the contracted character row image to be arranged in the sentence region 210 and the interpreted sentence character rows 400A, 400B, 400C and 400D are arranged above the respective line images. The above-described line image may be generated by connecting respective original sentence character row images to be divided by lengths of respective line of the sentence region thereafter.

When the above-described processings are finished, the document image processing apparatus 10 generates an output document image including the sentence region arranged with the original sentence character row image and the interpreted sentence character row (S107). The output document image may be generated as a bit map data or may be generated as a compressed image data of other format.

According to the above-described document image processing apparatus 10, the document image including both of the original sentence and the interpreted sentence while maintaining the layout also for a document image in which an arrangement space is not ensured for an interpreted sentence.

Further, the invention is not limited to the above-described exemplary embodiment.

Although according to the above-described exemplary embodiment, a data of an output document is generated as the image data, the invention is not limited thereto but data of the output document may be generated as an application data of a computer application dealing with an electronic document.

Further, a mode of arranging an original sentence character row image and an interpreted sentence character row extracted from a document image is not limited to that shown by the above-described exemplary embodiment. FIG. 6 shows other example of a mode of arranging a sentence region.

Figure 6A:
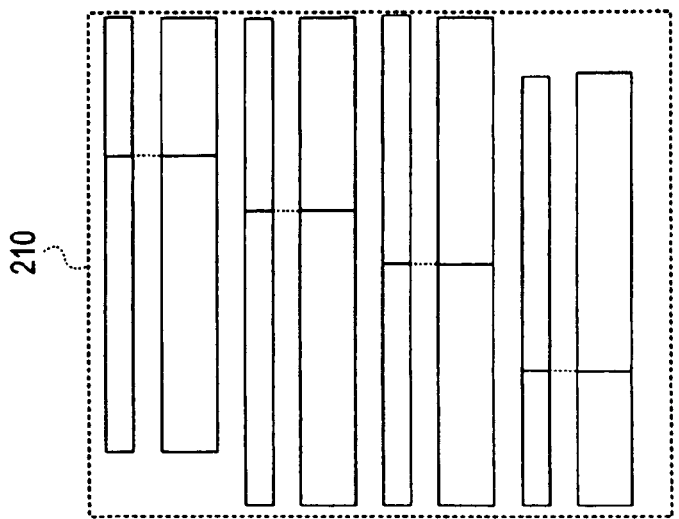
FIG. 6 is a view showing other example of a mode of arranging a sentence region.

For example, when a length of connecting original sentence character row image(s) and a length of connecting an interpreted sentence character row(s) are not equal and when the lengths are not aligned, as shown in FIG. 6A, plural lines of at least portions of lines of a longer one (interpreted sentence character row in the drawing) may summarizingly be arranged between lines of a shorter one (original sentence character row image in the drawing).

Figure 6B:
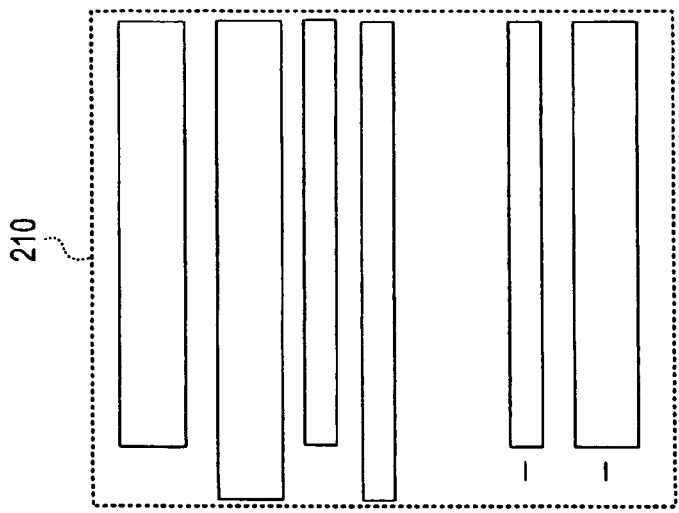

Further, as shown in FIG. 6B, the original sentence character row image and the interpreted sentence character row may respectively summarizingly be arranged at the sentence region 210 for respective lumps of a sentence structure of a paragraph, an item, a punctuation mark or the like.

Figure 6C:
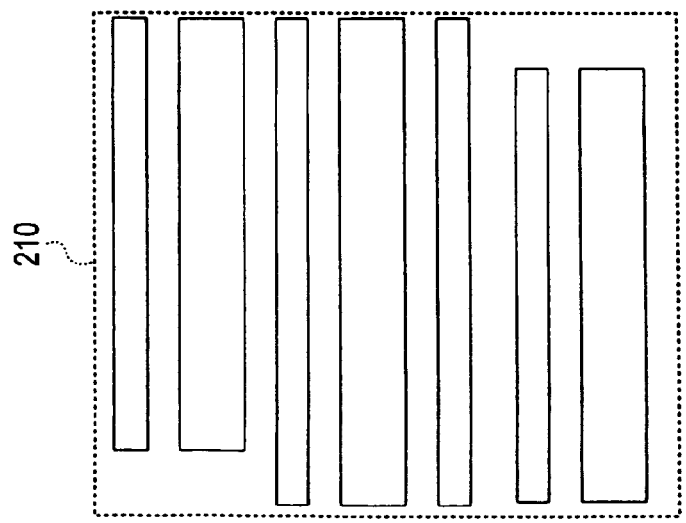

Further, as shown in FIG. 6C, the interpreted sentence character row interpreted based on the original sentence character row image may be arranged at either of an upper or a lower side of the original sentence character row image and the character size of the interpreted sentence character row may be corrected to be confined to a length of the original sentence character row image. Thereby, a corresponding relationship of interpretation of the original sentence character row image and the interpreted sentence character row may be made to be clear.

Further, by making colors of the original sentence character row image and the interpreted sentence character row differ from each other, the both may be differentiated from each other visually.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

Figure 5:
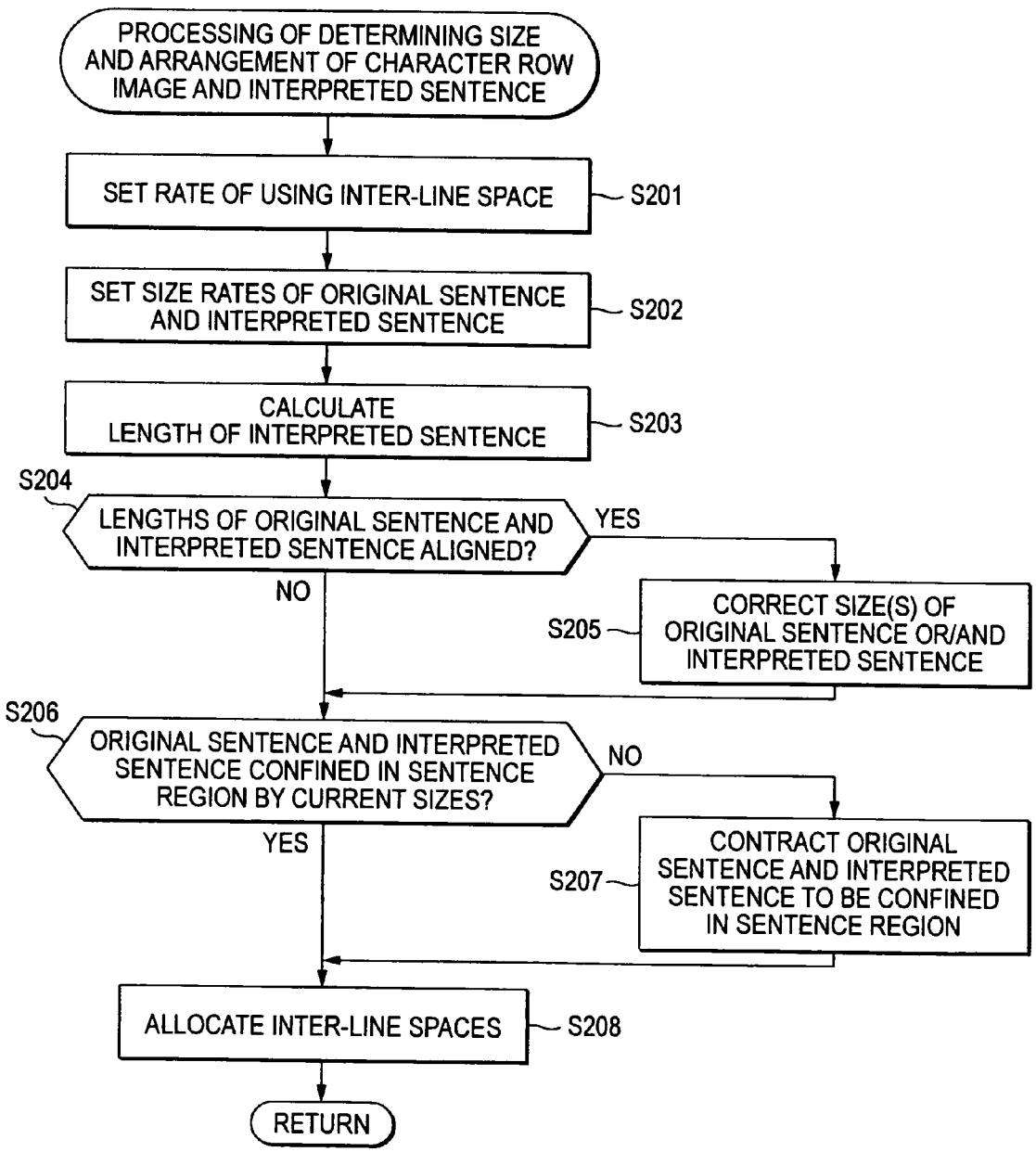
FIG. 5 is a flowchart of processing of the document image processing apparatus.

[FIG. 1]
100 DOCUMENT IMAGE ACQUIRING SECTION
102 SENTENCE REGION SPECIFYING SECTION
104 CHARACTER ROW IMAGE EXTRACTING SECTION
106 CHARACTER RECOGNIZING SECTION
108 INTERPRETING SECTION
110 CHARACTER SIZE DETERMINING SECTION
112 ARRANGING SECTION
114 IMAGE GENERATING SECTION
[FIG. 4]
START
S101 ACQUIRE DOCUMENT IMAGE
S102 ANALYZE LAYOUT
S103 EXTRACT CHARACTER ROW IMAGE FROM SENTENCE REGION SPECIFIED BY ANALYZING
S104 CHARACTER RECOGNIZING PROCESSING
S105 INTERPRETING PROCESSING
S106 PROCESSING OF DETERMINING SIZE AND ARRANGEMENT OF CHARACTER ROW IMAGE AND INTERPRETED SENTENCE
S107 GENERATE OUTPUT DOCUMENT IMAGE
END
[FIG. 5]
PROCESSING OF DETERMINING SIZE AND ARRANGEMENT OF CHARACTER ROW IMAGE AND INTERPRETED SENTENCE
S201 SET RATE OF USING INTER-LINE SPACE
S202 SET SIZE RATES OF ORIGINAL SENTENCE AND INTERPRETED SENTENCE
S203 CALCULATE LENGTH OF INTERPRETED SENTENCE
S204 LENGTHS OF ORIGINAL SENTENCE AND INTERPRETED SENTENCE ALIGNED?
S205 CORRECT SIZE (S) OF ORIGINAL SENTENCE OR/AND INTERPRETED SENTENCE

S206 ORIGINAL SENTENCE AND INTERPRETED SENTENCE CONFINED IN SENTENCE REGION BY CURRENT SIZES?
S207 CONTRACT ORIGINAL SENTENCE AND INTERPRETED SENTENCE TO BE CONFINED IN SENTENCE REGION
S208 ALLOCATE INTER-LINE SPACES
RETURN

What is claimed is:

1. A document image processing apparatus comprising:
a specifying section that specifies a sentence region including a character row from a document image;
an extracting section that extracts at least one of character row images included in the specified sentence region;
a recognizing section that recognizes respective characters included in the extracted character row image;
an interpreting section that interprets an original sentence character row comprising the recognized characters and generates an interpreted sentence character row;
an arranging section that arranges the respective character row images in the sentence region by contracting the respective character row images, the respective character row images each including an image of an original character row, the arranging section that arranges the generated respective interpreted sentence character rows in a vacant region except a region arranging the respective character row images from the sentence region; and
a generating section that generates a data of an output document arranged with the respective character row images and the respective interpreted sentence character rows in the sentence region,
wherein the arranging section arranges the interpreted sentence character row and the original sentence character row by first aligning the interpreted sentence character row and the original sentence character row, then by correcting a size of the longer of the interpreted sentence character row and the original sentence character row to match the length of the shorter, and then by confining the interpreted sentence character row and the original sentence character row in the sentence region.

2. The document image processing apparatus according to claim 1,
wherein the arranging section arranges a line image in the sentence region, and
each line image is constituted by dividing an image constituted by connecting the contracted respective character row images by a length of a line of the sentence region.

3. The document image processing apparatus according to claim 1, further comprising:
a determining section that determines a size of the character row image and a character size of the interpreted sentence character row such that a length of connecting the respective character row images and a length of connecting the respective interpreted sentence character rows are substantially equal to each other.

4. The document image processing apparatus according to claim 2, further comprising:
a determining section that determines a size of the character row image and a character size of the interpreted sentence character row such that a length of connecting the respective character row images and a length of connecting the respective interpreted sentence character rows are substantially equal to each other.

5. The document image processing apparatus according to claim 2,
wherein the arranging section arranges a line sentence in the sentence region,
each line sentence is constituted by dividing a sentence constituted by connecting the respective interpreted sentence character rows by the length of the line of the sentence region,
some of the line images, when a length of connecting the respective character row images is larger than a length of connecting the respective interpreted sentence character rows, are collectively arranged between the line sentences and
some of the line sentences, when the length of connecting the respective character row images is smaller than the length of connecting the respective interpreted sentence character rows, are collectively arranged between the line images.

6. The document image processing apparatus according to claim 1,
wherein the character row images and the interpreted sentence character rows are respectively collectively arranged with corresponding to a sentence structure including at least one of the original sentence character rows.

7. The document image processing apparatus according to claim 1, wherein
the arranging section arranges the interpreted sentence character row interpreted based on the character row image at either of an upper or a lower side of the character row image in the sentence region, and
the arranging section adjusts character size of respective characters of the interpreted sentence character row to be confined to a length of the character row image.

8. A document image processing method comprising;
extracting at least one of character row images included in the specified sentence region;
recognizing respective characters included in the extracted character row image;
interpreting an original sentence character row comprising the recognized characters and generates an interpreted sentence character row;
arranging the respective character row images in the sentence region by contracting the respective character row images, the respective character row images each including an image of an original character row, and the generated respective interpreted sentence character rows in a vacant region except a region arranging the respective character row images from the sentence region; and
generating a data of an output document arranged with the respective character row images and the respective interpreted sentence character rows in the sentence region,
wherein the arranging includes arranging the interpreted sentence character row and the original sentence character row by first aligning the interpreted sentence character row and the original sentence character row, then by correcting a size of the longer of the interpreted sentence character row and the original sentence character row to match the length of the shorter, and then by confining the interpreted sentence character row and the original sentence character row in the sentence region.

9. The document image processing method according to claim 8,
wherein arranging the respective character row images and includes, arranging a line image in the sentence region, and
each line image is constituted by dividing an image constituted by connecting the contracted respective character row images by a length of a line of the sentence region.

10. The document image processing method according to claim 8, further comprising:
  determining a size of the character row image and a character size of the interpreted sentence character row such that a length of connecting the respective character row images and a length of connecting the respective interpreted sentence character rows are substantially equal to each other.

11. The document image processing method according to claim 9, further comprising:
  determining a size of the character row image and a character size of the interpreted sentence character row such that a length of connecting the respective character row images and a length of connecting the respective interpreted sentence character rows are substantially equal to each other.

12. The document image processing method according to claim 9,
  wherein arranging the generated respective interpreted sentence character rows includes, arranging a line sentence in the sentence region,
  each line sentence is constituted by dividing a sentence constituted by connecting the respective interpreted sentence character rows by the length of the line of the sentence region,
  some of the line images, when a length of connecting the respective character row images is larger than a length of connecting the respective interpreted sentence character rows collectively arranged, are between the line sentences, and
  some of the line sentences, when the length of connecting the respective character row images is smaller than the length of connecting the respective interpreted sentence character rows collectively arranged, are between the line images.

13. The document image processing method according to claim 8,
  wherein the character row images and the interpreted sentence character rows are respectively collectively arranged with corresponding to a sentence structure including at least one of the original sentence character rows.

14. The document image processing method according to claim 8, wherein
  arranging the respective character row images and the generated respective interpreted sentence character rows includes, arranging the interpreted character row image interpreted based on the character row image at either of an upper or a lower side of the character row image in the sentence region, and
  arranging the generated respective interpreted sentence character rows includes, arranging character size of respective characters of the interpreted sentence character row to be confined to a length of the character row image.

15. A non-transitory computer readable medium storing a program causing a computer to execute a process for processing a document image, the process comprising:
  specifying a sentence region including a character row from the document image;
  extracting at least one of character row images included in the specified sentence region;
  recognizing respective characters included in the extracted character row image;
  interpreting an original sentence character row comprising the recognized characters and generating an interpreted sentence character row;
  arranging the respective character row images in the sentence region by contracting the respective character row images, the respective character row images each including an image of an original character row, and the generated respective interpreted sentence character rows in a vacant region except a region arranging the respective character row images from the sentence region; and
  generating a data of an output document arranged with the respective character row images and the respective interpreted sentence character rows in the sentence region,
  wherein the arranging includes arranging the interpreted sentence character row and the original sentence character row by first aligning the interpreted sentence character row and the original sentence character row, then by correcting a size of the longer of the interpreted sentence character row and the original sentence character row to match the length of the shorter, and then by confining the interpreted sentence character row and the original sentence character row in the sentence region.

16. The document image processing apparatus according to claim 1,
  wherein at least one of the respective character row images is divided into a divided portion, the divided portion being arranged at a next line with another respective character row image.

17. The document image processing apparatus according to claim 8,
  wherein at least one of the respective character row images is divided into a divided portion, the divided portion being arranged at a next line with another respective character row image.

18. The document image processing apparatus according to claim 15,
  wherein at least one of the respective character row images is divided into a divided portion, the divided portion being arranged at a next line with another respective character row image.

19. A document image processing apparatus comprising:
  a specifying section that specifies a sentence region including a character row from a document image;
  an extracting section that extracts at least one character row images includes in the specified sentence region;
  a recognizing section that recognizes respective characters included in the extracted character row image;
  an interpreting section that interprets an original sentence character row comprising the recognized characters and generates an interpreted sentence character row;
  a determination unit that determines whether the original sentence and the interpreted sentence of current character sizes are confined in the sentence region or not,
  wherein the determination unit calculates a maximum height $H_{max}$ of a region capable of arranging the original sentence and the interpreted sentence in the sentence region from predetermined inter-lines rates, and in case the following conditional equation (1) is satisfied, the size of the original sentence and the interpreted sentence are respectively confined, $$H1 \cdot L1 + H2 \cdot L2 < H_{max} \quad (1)$$

H1: Height of line original sentence character size of original sentence
H2: Height of line interpreted sentence character size of interpreted sentence
L1: the number of original lines
L2: the number of interpreted lines, an arranging section that arranges the respective character row images in the sentence region by contracting the respective character row images, the arranging section that arranges the generated respective interpreted sentence character rows in a vacant region except a region arranging the respective character row images from the sentence region, wherein the arranging section arranges a line image in the sentence region, and each line image is constituted by dividing an image constituted by connecting with the contracted respective character row images by a length of a line of the sentence region, and a generating section that generates a data of an output document arranged with the respective character row images and the respective interpreted sentence character rows in the sentence region, wherein the arranging section arranges the interpreted sentence character row and the original sentence character row by first aligning the interpreted sentence character row and the original sentence character row, then by correcting a size of the longer of the interpreted sentence character row and the original sentence character row to match the length of the shorter, and then by confining the interpreted sentence character row and the original sentence character row in the sentence region.

* * * * *